United States Patent [19]

Ciokajlo et al.

[11] Patent Number: 4,987,736
[45] Date of Patent: Jan. 29, 1991

[54] LIGHTWEIGHT GAS TURBINE ENGINE FRAME WITH FREE-FLOATING HEAT SHIELD

[75] Inventors: John J. Ciokajlo, Cincinnati, Ohio; Daniel S. Vogt, Elsmere, Ky.

[73] Assignee: General Electric Company, Cincinnati, Ohio

[21] Appl. No.: 284,277

[22] Filed: Dec. 14, 1988

[51] Int. Cl.$^5$ .............................................. F02C 7/20
[52] U.S. Cl. .................................. 60/39.31; 60/39.32; 415/138; 415/142
[58] Field of Search ............................ 60/39.32, 39.31; 415/142, 138, 136

[56] References Cited

U.S. PATENT DOCUMENTS

| | | | |
|---|---|---|---|
| 2,869,941 | 1/1959 | Shoup, Jr. et al. | 415/142 |
| 2,919,888 | 1/1960 | Simmons | 60/39.32 |
| 2,928,648 | 3/1960 | Haines et al. | 415/138 |
| 2,938,336 | 5/1960 | Peterson . | |
| 3,104,525 | 9/1963 | Shields . | |
| 3,261,587 | 7/1966 | Rowley | 415/138 |
| 3,403,889 | 10/1968 | Ciokajlo | 415/138 |
| 3,661,477 | 5/1972 | Westrum | 415/138 |
| 3,666,251 | 5/1972 | McMurtry et al. | 60/39.32 |
| 3,824,031 | 7/1974 | Gilbert | 415/138 |
| 3,826,088 | 7/1974 | Nash et al. . | |
| 4,369,016 | 1/1983 | Dennison . | |
| 4,478,551 | 10/1984 | Honeycutt et al. | 415/142 |
| 4,492,078 | 1/1985 | Williamson | 60/39.31 |
| 4,790,137 | 12/1988 | Quinn | 60/39.32 |
| 4,820,117 | 4/1989 | Larrabee et al. | 415/142 |

*Primary Examiner*—Louis J. Casaregola
*Attorney, Agent, or Firm*—Jerome C. Squillaro

[57] ABSTRACT

A lightweight rigid turbine engine frame incorporates a one piece annular cast outer casing formed with a circumferential polygonal reinforcing section. The outer casing is separated and spaced from an inner ring by a plurality of radially extending spacer struts. The spacer struts are clamped in compression between the inner ring and outer casing by tensioning members such as bolts. A thermally free floating heat shield is mounted to the bolts in a manner which minimizes thermal stresses by avoiding all undesirable constraint of the heat shield by the engine frame.

15 Claims, 7 Drawing Sheets

LIGHTWEIGHT GAS TURBINE ENGINE FRAME WITH FREE-FLOATING HEAT SHIELD

BACKGROUND OF THE INVENTION

1. Field of the Invention

This invention relates generally to a turbine frame having a simplified structure and particularly relates to a turbine frame assembly incorporating a spoked array of bolts and spacer struts for rigidly interconnecting inner and outer concentrically aligned frame members while supporting a thermally unconstrained heat shield assembly.

2. Description of Prior Developments

Aircraft turbine engines employ two or more structural assemblies known as frames to support and accurately position the engine rotor within the stator. Each frame includes a stationary inner casing supported within a stationary outer casing by a number of radial struts contoured for minimum interference with the engine flow. The frame at the rear of the engine, usually aft of the turbine, is typically protected from the extreme turbine discharge gas temperatures by air cooled heat shields which include flowpath liners and fairings.

The construction of prior turbine engine frames has required the formation of numerous welded joints between the outer casing, the struts, the inner casing and the heat shield. Although the resulting welded frames performed satisfactorily, they were permanently fixed configurations which did not readily accommodate the replacement or repair of individual frame components. Moreover, such welded frames were often heavy and relatively difficult to construct. In addition, the resulting frame assemblies typically required replacement or repair after moderate periods of operation. These characteristics have posed significant operational and maintenance problems in aircraft applications where simplified repair, reduced weight and extended life are most desirable.

The heat shields which protect the inner and out casings are known as flowpath liners and together with the fairings thermally shield the entire rear engine frame. Heat shields are necessary to protect the engine frame because of the limited heat tolerance of available frame construction materials. Heat shields are also used to limit the thermal expansion and distortion of the frames. Excessive expansion and distortion of the frames caused by thermal gradients adversely affects the alignment of the rotor within the engine thereby adversely affecting engine performance.

As the hot gasses exiting the combustion and turbine section of an advanced gas turbine engine can be above the melting temperature of the available materials used in heat shield construction, the heat shields themselves must be efficiently cooled. The more efficient the heat shield cooling system is, the less cooling air is required to cool the heat shields and the, more efficient is the overall turbine engine cycle.

One of the most efficient methods of cooling the heat shields combines impingement cooling with film cooling. In this dual cooling method the cooling air first passes through a perforated plate known as an impingement baffle. The impingement baffle divides the cooling air into a multitude of small high velocity jets which impinge on and cool the back surface of the metal heat shields forming the flowpath liners. This portion of the cooling method is called impingement cooling.

The cooling air is then introduced into the engine flowpath through slots or holes known as air cooling film injection holes which extend through the flowpath liners. This creates a thermally protective film of cool air on the surfaces of the flowpath liners which are directly exposed to the hot exhaust gasses. This portion of the cooling method is called film cooling.

A long standing problem in designing heat shields for turbine engine frames has been the constraint of the thermal expansion of the hot flowpath heat shield surfaces caused by various structural members used to reinforce and secure the heat shields to the engine frames. The constraint of the thermal expansion of the heat shields has resulted in buckling and cracking of the heat shield surfaces and has imposed severe limits on the useful life of turbine frame heat shield systems incorporated within modern high performance engines.

Accordingly, a need exists for a lightweight, low cost turbine engine frame having an extended operational life and a relatively simple design which avoids the use of permanent weld joints. A need also exists for a turbine engine frame design which facilitates assembly and construction procedures, which obviates the use of special assembly tooling, and which facilitates replacement and repair of the frame members. A further need exists for a turbine engine frame which incorporates a free-floating heat shield adapted to thermally expand and contract virtually without constraint in order to minimize thermal stresses during engine operation.

SUMMARY OF THE INVENTION

The present invention has been developed to solve the problems noted above and therefore has as a primary object the provision of a low cost, lightweight turbine engine frame of simple construction which incorporates extensive use of castings in order to avoid the use of costly welded joints. The preferred embodiment may be fabricated with conventional machining techniques thereby avoiding more expensive exotic machining methods.

Another object is to provide a turbine engine frame which uses bolts and spacer struts to interconnect an inner structural ring of the turbine frame with the outer casing.

Yet another object is to provide a turbine engine frame which incorporates a virtually free-floating heat shield which minimizes thermal stresses within the heat shield during thermal cycling of the engine so as to extend heat shield life.

These and other objects are achieved according to the invention by the provision of a turbine engine frame having a plurality of radially extending bolts which are circumferentially arranged in a spoked array to rigidly interconnect the inner ring with the outer casing. A heat shield is freely positioned around the bolts in a manner which allows free axial, radial and circumferential expansion of the heat shield as it undergoes thermal cycling.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the Drawings.

In the various figures of the drawing, like reference characters designate like parts.

DETAILED DESCRIPTION OF THE PREFERRED EMBODIMENTS

Figure 1:
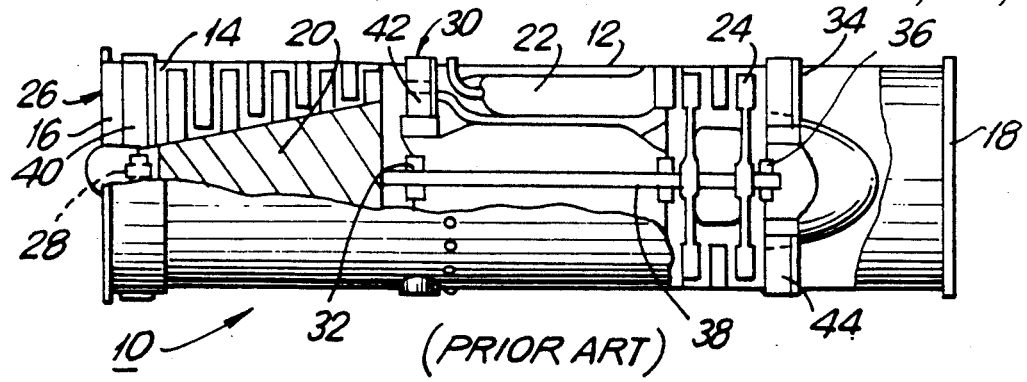
FIG. 1 is a schematic side elevational view, partially in section, of a gas turbine engine showing the general configuration of the gas turbine engine and the location of the engine frames.

A brief description of the major features of a gas turbine engine will aid in the appreciation of the present invention by identifying the location and arrangement of the turbine frame assemblies to which the free floating heat shields are applied. Referring first to FIG. 1, a portion of a gas turbine engine (10) is illustrated in partial cross-section. The engine (10) includes an outer casing (12) which surrounds an annular flowpath (14) extending axially between an inlet (16) and an exhaust outlet (18) located at opposite ends of the engine (10).

During engine operation, ambient air is drawn into the inlet (16) and is compressed to a higher pressure in a compressor (20), from which the compressed air is discharged into an annular combustor (22) where fuel is burned to produce high energy products of combustion. From the combustor (22), the motive fluid is directed through a turbine (24) where a portion of its energy is extracted to drive the compressor (20), and the fluid is then discharged as a high energy stream through the exhaust outlet (18).

To maintain the various components of the engine in their proper operating positions relative to each other, engine frame assemblies are provided for rigidly interconnecting the stationary stator components and for providing bearing supports for the rotor. More particularly, the engine (10) includes a front frame assembly (26) supporting a front bearing (28), a mid-frame assembly (30) supporting a mid-shaft bearing (32), and a turbine frame (34) supporting an aft bearing (36). The rotor (38) is rotatably mounted in bearings (28, 32 and 36).

Each frame assembly (26, 30 and 34) respectively includes a plurality of radial support struts (40, 42 and 44) which project across the annular flowpath (14) to interconnect the inner and outer frame members of the frame assemblies. since the temperature of the motive fluid flowing through the flowpath (14) changes very rapidly during transient engine operation, substantial thermal stresses can be created in the rigid frame assemblies if the struts are allowed to heat up and cool down at rates differing substantially from those of the inner and outer frame members. This is particularly true with respect to the turbine frame assembly (34) since the exhaust gasses which surround the turbine frame assembly are subject to the most rapid and greatest changes in operating temperatures and resulting thermal stresses.

Accordingly, the heat shield assembly of the present invention, which minimizes such destructive thermal stresses, is illustrated in conjunction with a modified turbine frame assembly analogous to turbine frame (34). However, the heat shield and engine frame of the present invention are equally applicable to other rigid assemblies, such as the front and mid-frame assemblies (26 and 30) which may also be exposed to motive fluid experiencing substantial and rapid changes in temperature.

Figure 4:
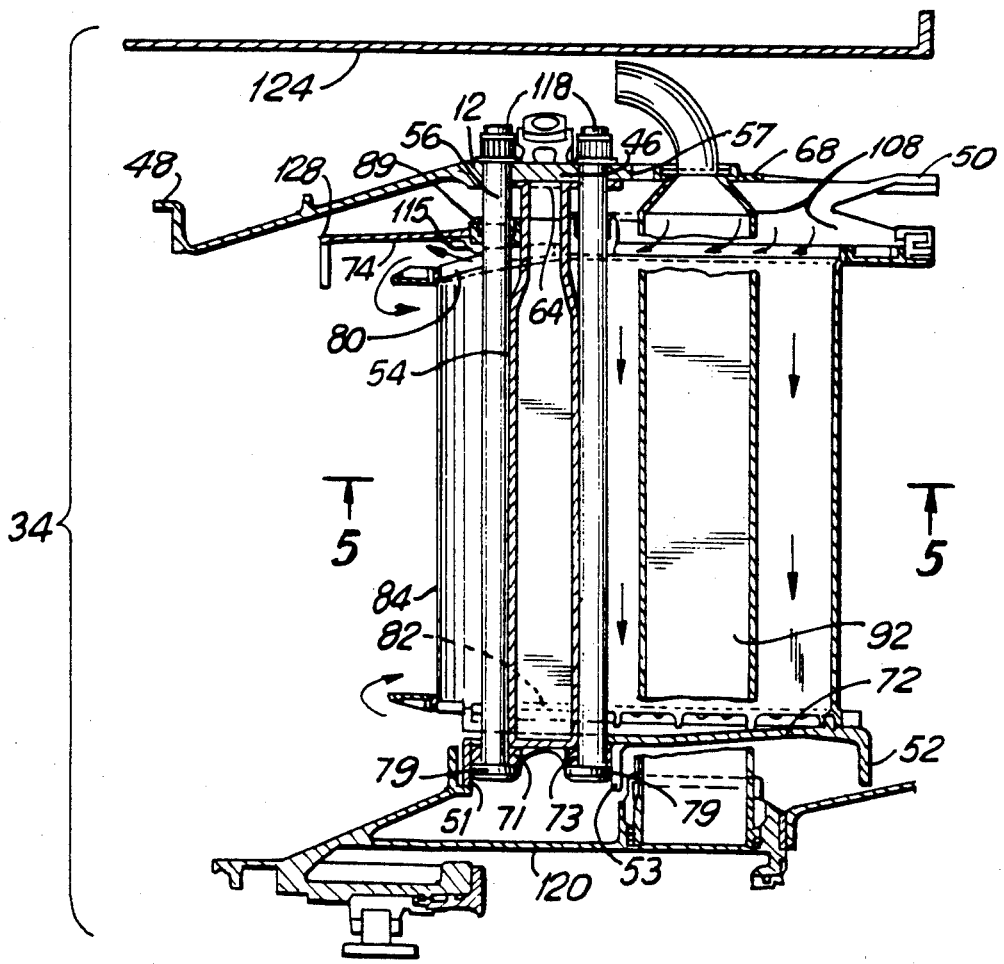
FIG. 4 is a sectional view taken along line A—A of FIG. 2.
Figure 5:
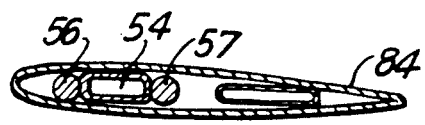
FIG. 5 is a sectional view taken along line B—B of FIG. 4.
Figure 2:
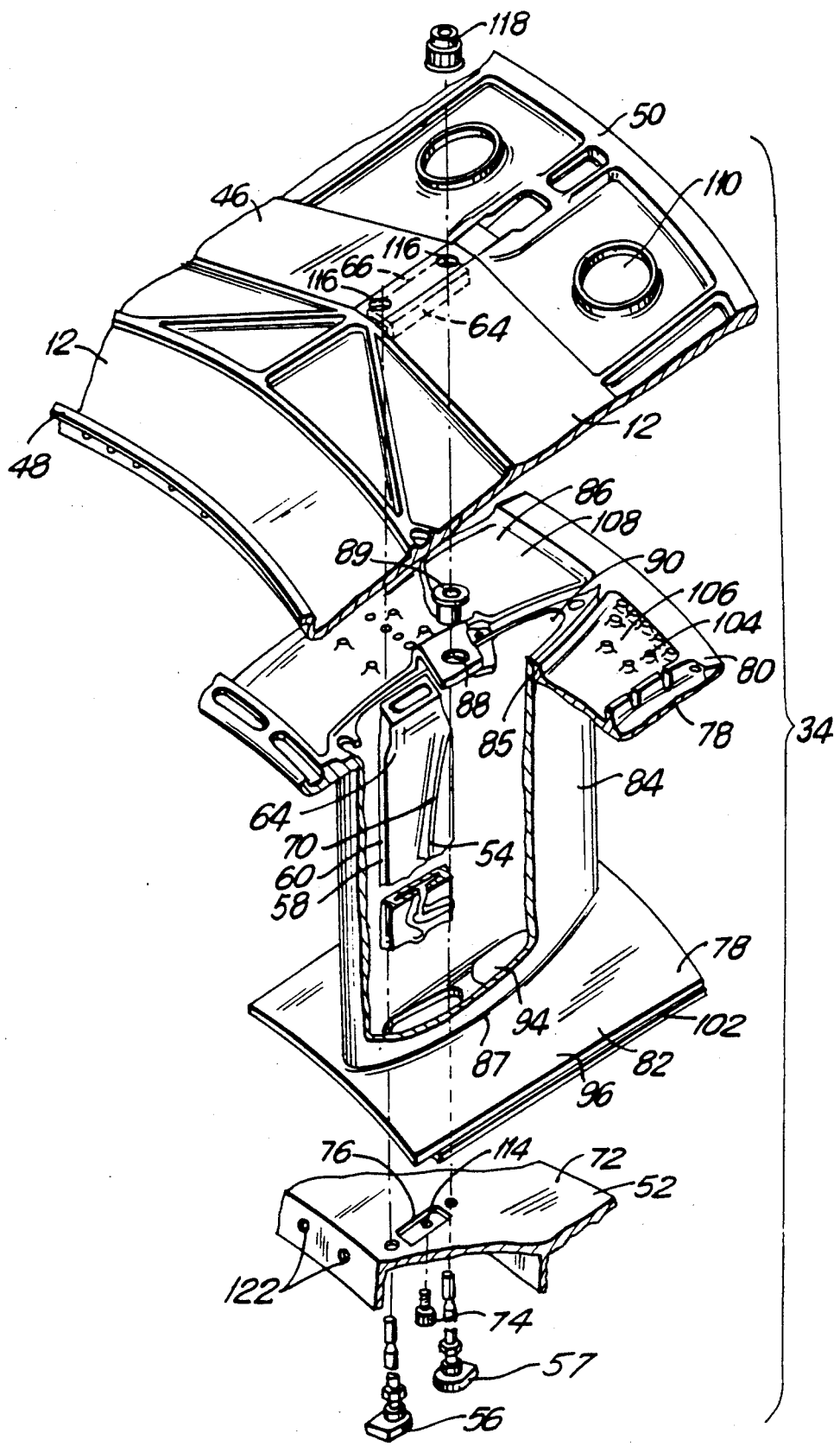
FIG. 2 is a partially sectioned, exploded fragmental perspective view of the turbine engine frame of the present invention.
Figure 3:
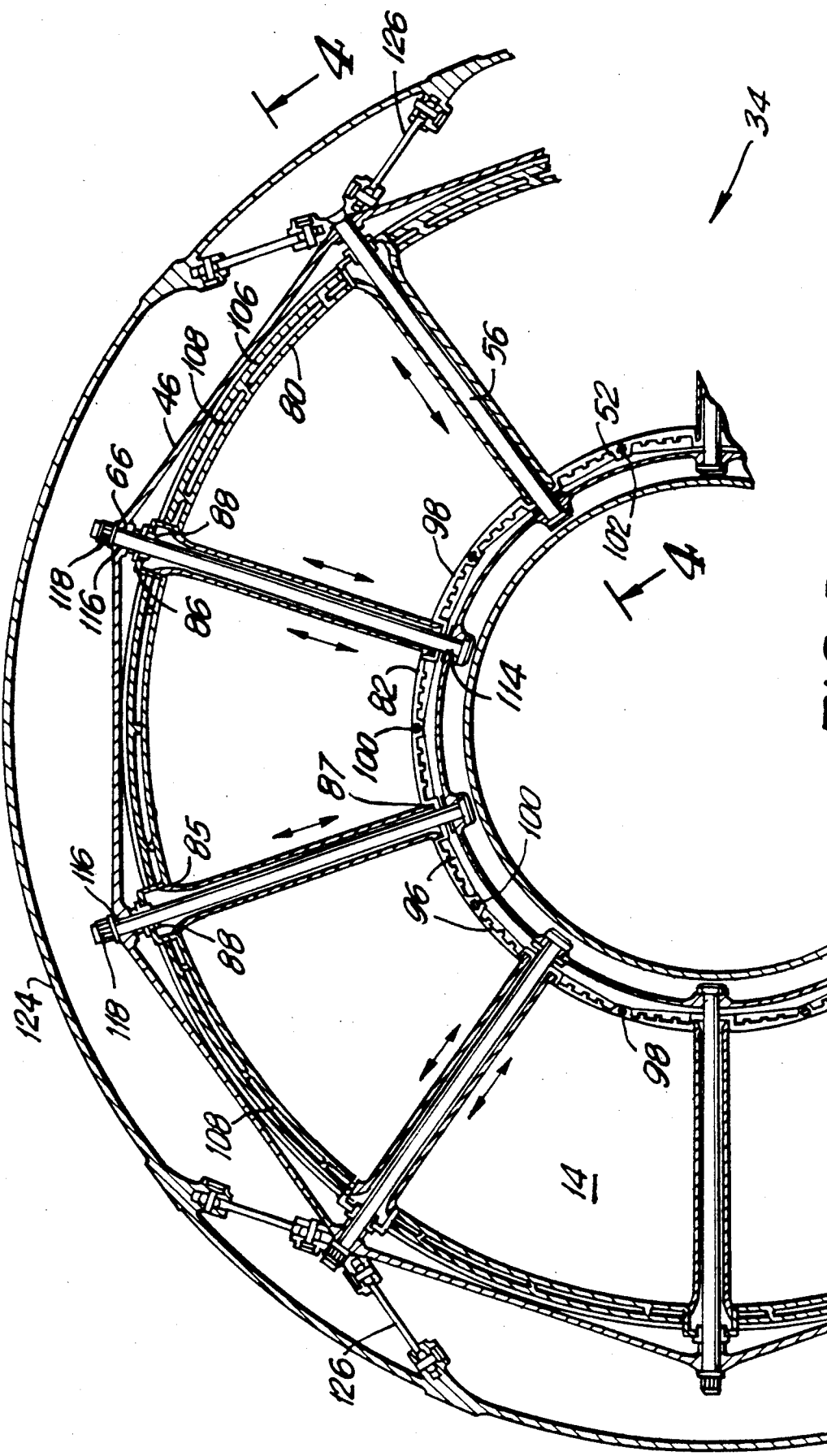
FIG. 3 is a sectional end view of the turbine engine frame showing the spoked interconnection of the inner ring with the outer casing.
Figure 6:
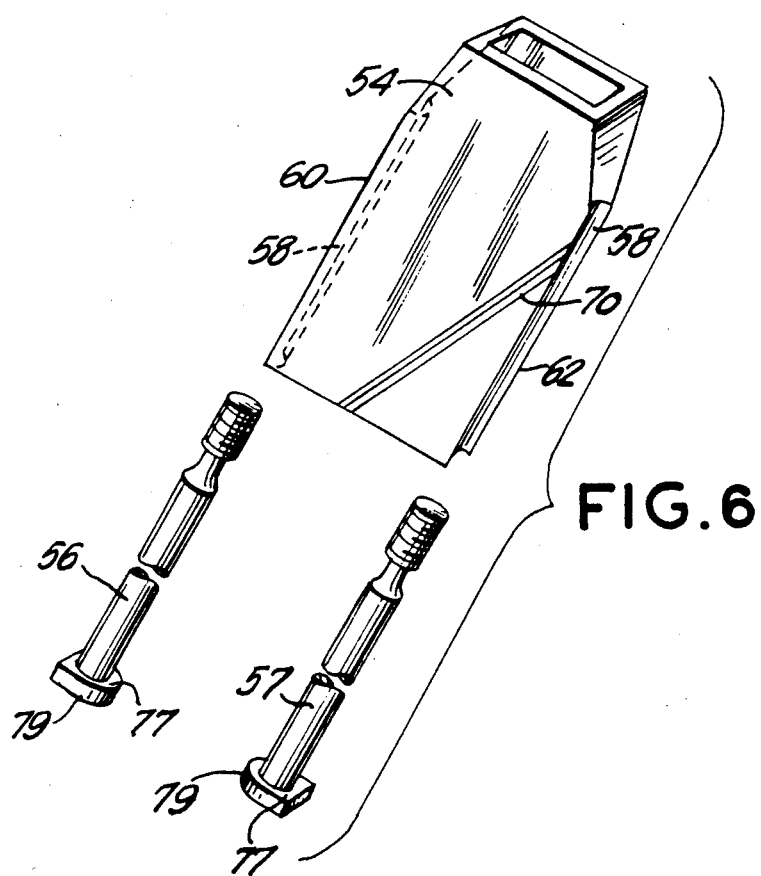
FIG. 6 is a perspective view of the spacer strut and bolt assembly.

As seen in FIGS. 2, 3 and 4, turbine frame (34) includes a unitary annular 360° cast outer casing (12) having a circumferentially extending central polygonal ribbed portion (46). The ribbed portion (46) is axially bounded between a circular flanged front rim (48) and a circular rear rim (50). The polygonal configuration of ribbed portion (46) increases the stiffness and rigidity of the outer casing (12) with a minimum of material and weight. Weight reduction in the outer casing (12) is particularly desirable since the outer casing is one of the heaviest members in the turbine frame (34).

The outer casing (12) controls the frame radial spring constant which in turn dictates engine rotor dynamics. An approximate increase of 30% in the radial spring constant of the outer casing can be achieved with the polygonal ribbed configuration as compared to a conventional cylindrical outer casing.

Unlike a ring under uniformly spaced outwardly directed radial loads, a polygon under such radial loads applied outwardly to each interior corner experiences only tensile loading within each flat side of the polygon. A ring experiences both tensile loads and bending loads in the arches extending between the points of loading. This added bending load present in a ring shaped frame reduces the stiffness or spring constant of the structure. The increase in frame stiffness offered by a polygonal outer casing is most desirable in that the stationary and rotating engine elements may be accurately aligned and maintained in place with the aid of the rigid outer casing.

An inner structural ring (52) is preferably cast as a one piece ring provided with integral forward and aft structural flanges (51, 53). The inner ring (52) is mounted concentrically within the outer casing (12) by a series of radially extending cast spacer struts (54). The hollow lightweight spacer struts are preferably clamped between the inner ring (52) and outer casing (12) by radially aligned removable structural in tension members such as threaded rods or bolts (56, 57).

As best seen in FIGS. 2, 4, 5 and 6, each spacer strut (54) is axially constrained between a pair of the forward and aft bolts (56, 57). Although a pair of bolts for each spacer strut is preferred, certain applications could function satisfactorily with a single bolt (56) mounted inside a hollow spacer strut (54). A pair of bolts is partially nested within accurately dimensioned radially extending channels (58) formed in the axially leading and trailing faces (60, 62) of the spacer struts. The channels (58) preferably complement the profile of the bolts (56, 57) to receive axial, radial and circumferential support from the bolted turbine frame.

The turbine frame may include any number of evenly distributed spacer struts, although a total of ten or twelve spacer struts is preferred for providing adequate rigidity and strength to the bolted turbine frame (34). As clearly seen in FIG. 2, the bolts (56, 57) are circumferentially arranged between and through the inner ring (52) and outer casing (12) in the pattern of wheel spokes to evenly distribute the clamping forces therebetween.

Figure 7:
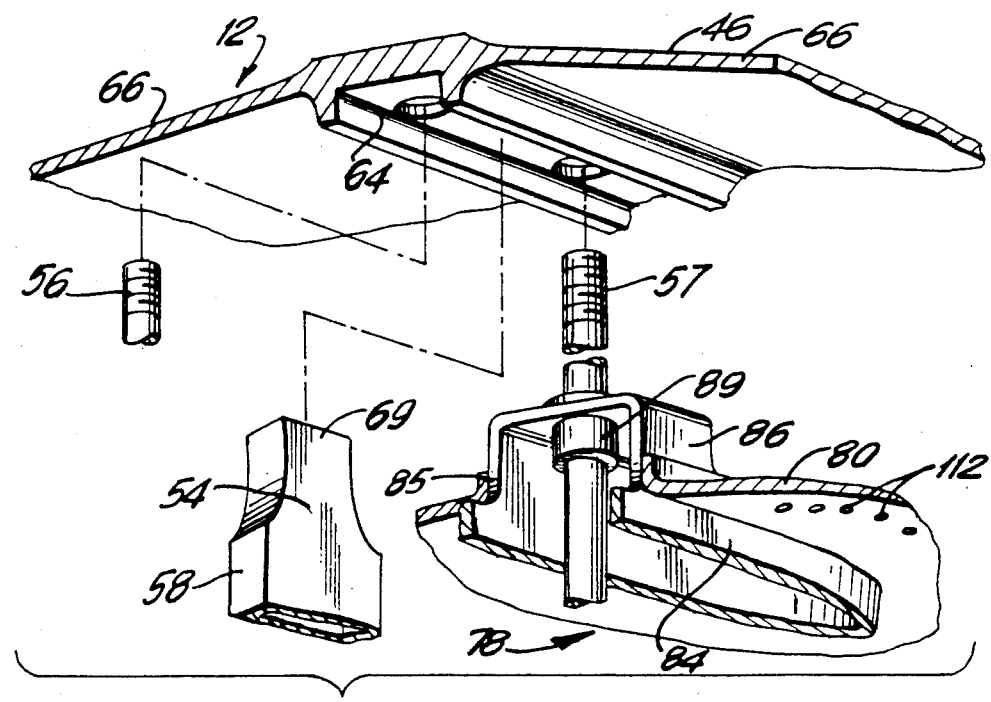
FIG. 7 is a partially sectioned, partially exploded fragmental perspective view of the interconnection between the outer casing, spacer struts, bolts and heat shield assembly.

A positioning slot (64), (FIG. 7) preferably rectangular in shape, extends axially beneath each intersection of adjoining polygonal sides or chord faces (66) of the ribbed band (46). Slot (64) is provided in the inner surface (68) of the outer casing (12) to receive the complimentary rectangular outer radial end portion (69) of each spacer strut (54) and to locate, support and anchor the spacer strut therein.

The axially elongated or rectangular fit of the spacer strut (54) within the outer casing (12) prevents the spacer strut from rotating or twisting about its longitudinal radially extending axis. stiffening ribs (70) may be cast along the surface of the spacer struts to provide even greater strength and rigidity to the struts (54) and to channel fan air into the heat shield inner cavity for cooling the fairing leading edges and for inner flowpath cooling.

The radial inner end of the spacer strut (54) seats upon the outer surface (72) of the inner ring (52). Each spacer strut may be secured to the inner ring during assembly with a small threaded fastener (74). To provide a secure seat for the radially inner end of the spacer strut, a planar surface or flat (76) may be formed on surface (72).

Figure 8:
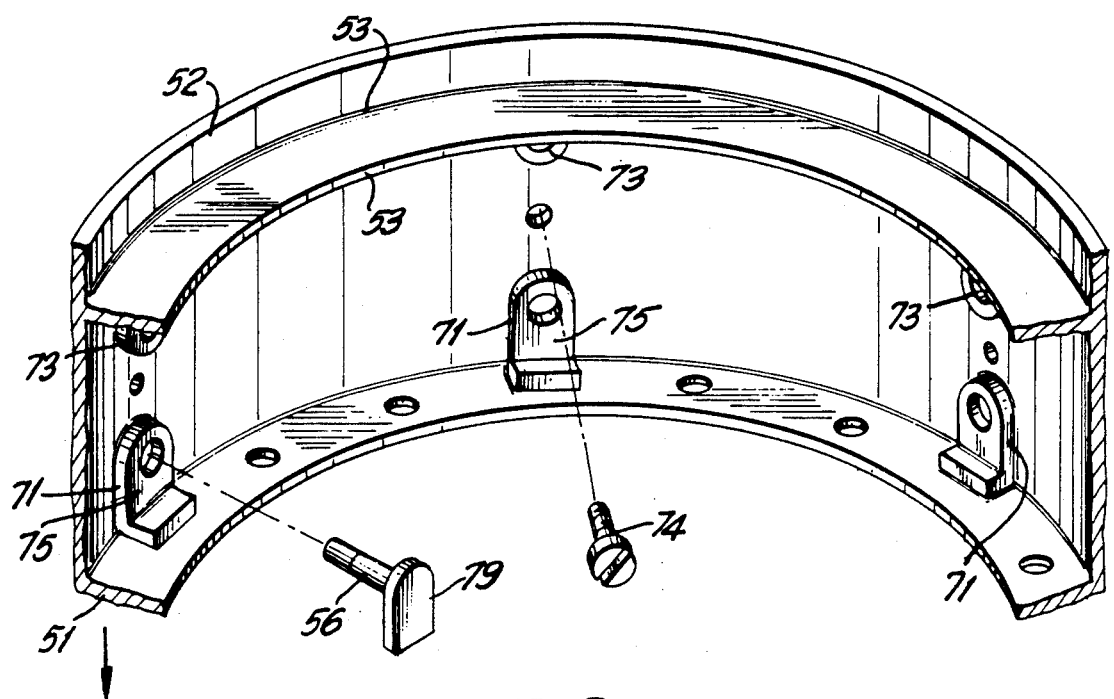
FIG. 8 is a fragmental perspective view of the interior of the inner ring.

Forward and aft bosses (71, 73) (FIG. 8) are cast on the inside of the inner ring (52) and machined to form orthogonally oriented lands (75). Lands (75) provide a stepped seat for the matching surfaces (77) (FIG. 6) of bolts (56, 57). Preferably, bolts (56, 57) are formed with "D" shaped heads (79) for preventing the bolts from turning during assembly.

Figure 9:
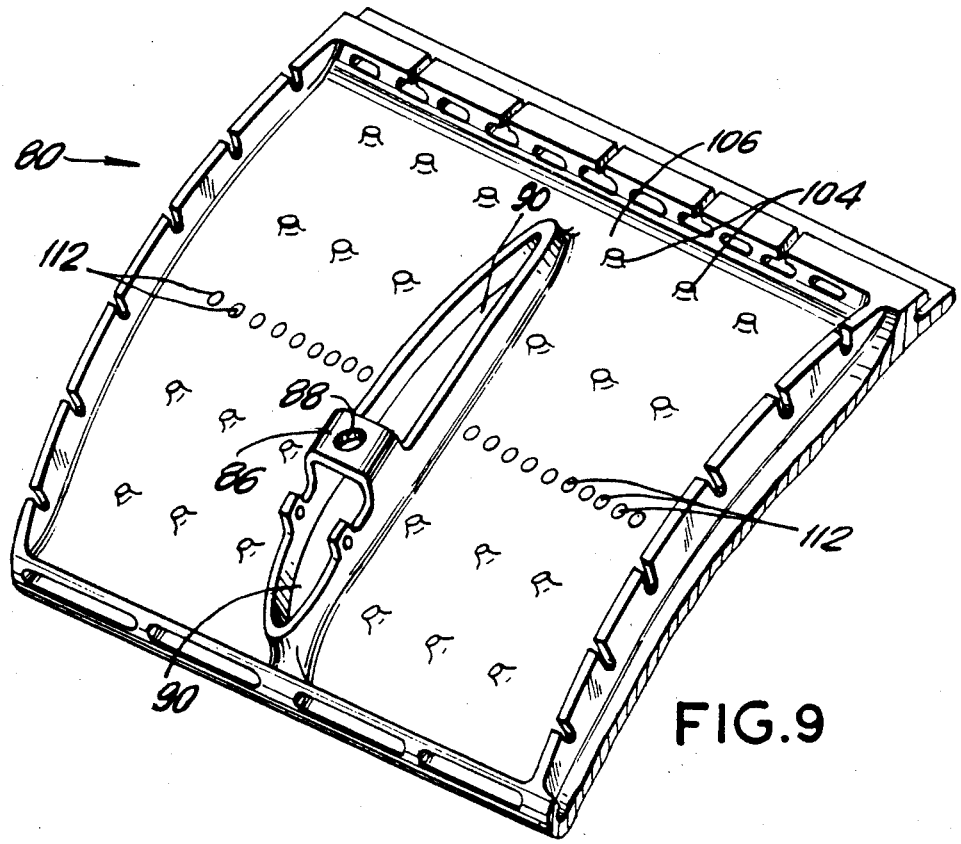
FIG. 9 is a fragmental perspective view of one section of the outer flowpath liner.
Figure 10:
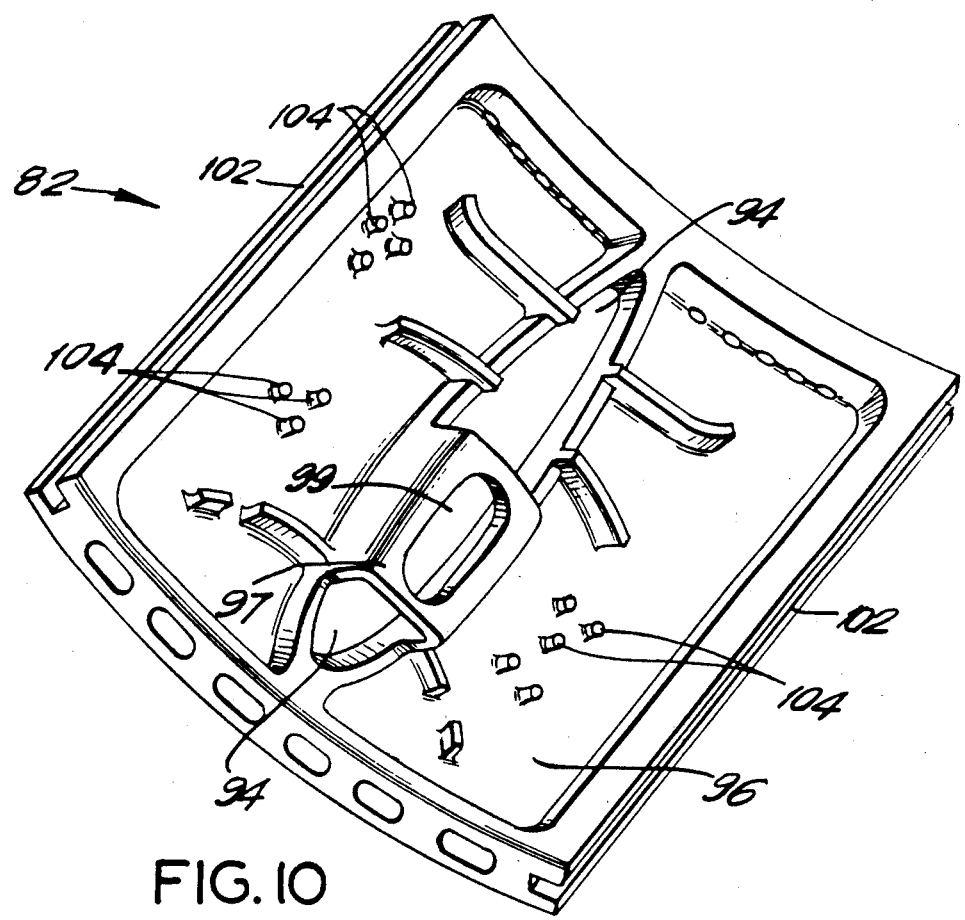
FIG. 10 is a bottom perspective view of an inner flowpath segment showing the support strut and bolts in section.

As further depicted in FIGS. 2, 3 and 4, the bolted or clamped structure of turbine frame (34) provides a particularly effective mounting arrangement for receiving a heat shield assembly (78) with a virtually free-floating fit. The heat shield assembly (78) is formed as a one-piece brazed structure from a continuous unitary 360° cast or fabricated outer flowpath liner (80), a fragment of which is shown in FIG. 9, an axially segmented cast inner flowpath liner (82), one segment of which is shown in FIG. 10, and a cast fairing (84) extending radially between and interconnecting the flowpath liners (80, 82) (FIG. 2). By casting or chem milling the outer flowpath liner (80), an efficient use of metal is achieved and results in a lower weight assembly.

Each fairing (84) is brazed at its radial outer end to the outer flowpath liner (80) along braze joint (85) (FIGS. 2, 7 and 11), and further brazed at its radial inner end to the inner flowpath liner 82 along braze joint (87) (FIG. 2), thereby forming the unitary cast and brazed heat shield assembly (78). An economical one-step brazing method may be used to avoid the more costly multi-step braze cycles.

Figure 11:
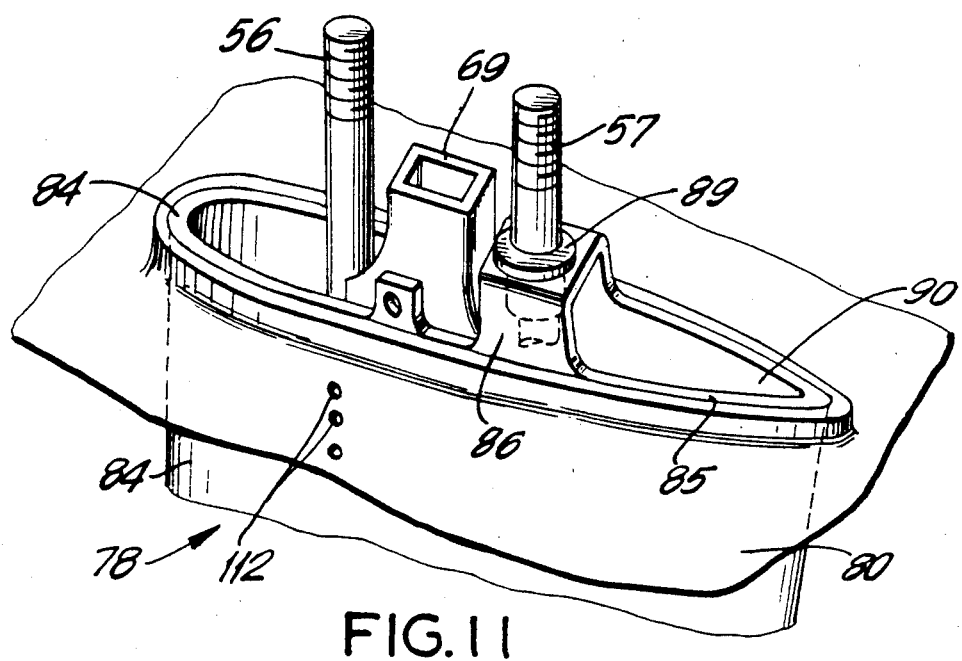
FIG. 11 is a fragmental perspective view of the interconnection between the spacer struts, bolts and heat shield assembly.

In order to allow the heat shield assembly (78) to freely expand axially, radially and circumferentially during thermal cycling, the heat shield assembly is positioned and guided on the turbine frame (34) by a single bolt (57) (FIG. 11). An arched bracket (86) formed on the outer flowpath liner (80) is provided with an accurately machined guidance hole (88) (FIG. 2) for receiving a hardened wear sleeve (89) which in turn receives the aft bolt (57) with a close sliding fit. A carefully controlled clearance of several mils is maintained between the aft bolt (57) and the wear sleeve (89) to allow the heat shield to radially expand and contract with a sliding movement over the bolt. The aft bolts (57) support the heat shield assembly via sliding contact within the wear sleeve (89) and thereby provide axial and circumferential support in combination with radial guidance.

It should be emphasized that the only constant contact between the heat shield assembly (78) and the turbine frame (34) is through the aft bolt (57). The outer flowpath liner (80) is formed with a large axially-elongated clearance slot (90) (FIGS. 2, 9) and a similar clearance slot (94) (FIGS. 2, 10) is formed in the inner flowpath liner to allow the spacer strut (54), forward bolt (56) and lubricant service ducts (92) to freely pass therethrough. The clearance slot (94) further provides clearance for the aft bolt (57).

When the heat shield assembly (78) is exposed to changes in temperature, it is completely free to expand and contract axially and circumferentially without restraint from the spacer strut (54) or the bolts (56, 57). The unitary heat shield assembly (78) radially rises and falls within the turbine frame (34), as indicated by the directional arrows in FIG. 3, while being radially guided over the bolts (57). Moreover, the inner ring (52) and outer casing (12) may expand and contract in all directions without loading the heat shield assembly (78). In this manner, thermal stresses within the heat shield assembly are virtually eliminated since resistance to thermal expansion and contraction is avoided by this freely sliding or "free-floating" design.

The inner flowpath liner (82) as seen in FIG. 2 and 10 is constructed as a 360° annular shell from a series of indiVidual annular segments (96). An arched bracket (97) is formed on each inner flowpath liner segment (96) and a carefully dimensioned clearance hole (99) is formed through the bracket to closely complement the profiles of the bolts (56) and spacer strut (54).

Figure 12:
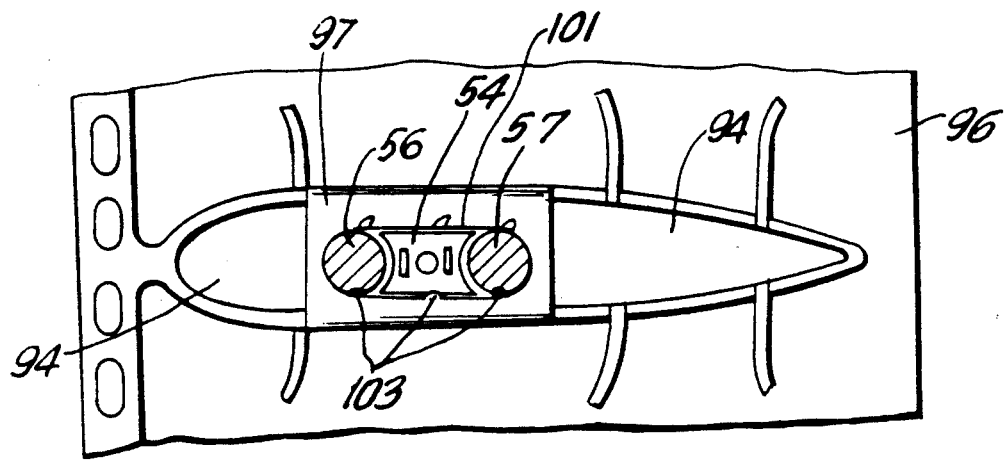
FIG. 12 is a fragmental top plan view partially in section showing the contact and support points between the inner flowpath segments and the spacer struts and bolts.

Referring to FIG. 12, the bracket edges (101) adjacent the clearance hole (99) receive localized support from the bolts (56, 57) and spacer strut (54) at support points (103). This support assists in resisting any tangential loading applied to the heat shield assembly (78). However, the inner flowpath liner receives no axial support from the bolts or spacer struts. This construction allows free radial movement of the inner flowpath liner (82).

A small axially-extending clearance slot or gap (98) is maintained between adjacent segments (96) and a resilient seal (100) is mounted within the grooved edges (102) of the segments to maintain a closed passage to the gasses flowing through the flowpath (14). Each gap (98) provides the clearance necessary to accommodate the circumferential thermal expansion between adjacent inner flowpath segments and allows the entire heat shield assembly (78) to slide radially over the bolts (57).

The segmented construction of the inner flowpath liner permits the heat shield assembly (78) to expand at different rates between the inner flowpath liner (82) and the outer flowpath liner (80). This arrangement further reduces the occurrence of thermal stresses within the heat shield assembly (78).

It is preferable to form the outer flowpath liner (80) as a solid unitary casting or fabrication rather than the inner flowpath liner (82) in order to minimize the risk of air coolant leakage. That is, leakage is less likely along the short clearance gaps (98) than along a corresponding longer gap in the outer flowpath. This unitary construction also results in an overall lighter frame assembly and resists buckling of the outer flowpath liner (80).

Figure 13:
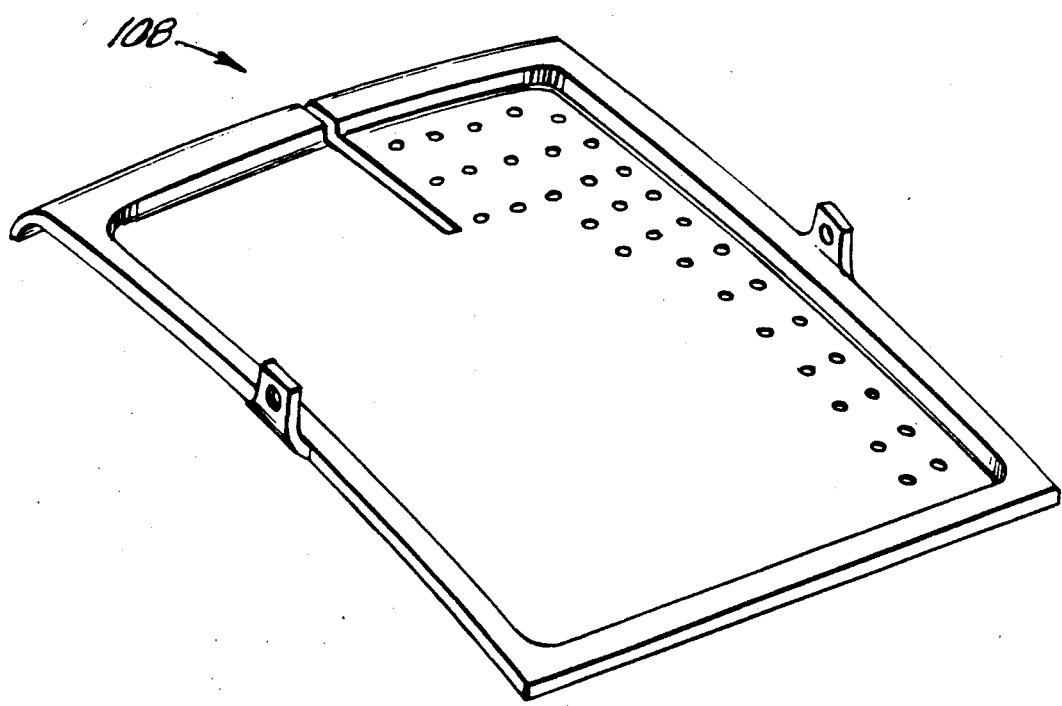
FIG. 13 is a perspective view of an impingement baffle which lies within and covers each section of the outer flowpath liner of FIG. 7.

Radially projecting support pins (104) (FIG. 9) are cast in the outer surface (106) of the outer flowpath liner (80) for radially positioning and freely supporting a multi-perforated impingement baffle (108) (FIG. 13) on the head shield assembly (78). The support pins (104) also act as fins for additional convection cooling of the outer flowpath liner (80). The impingement baffle (108), as seen in detail in FIG. 13, is provided for diffusing a stream of cooling air into multiple jets for cooling the outer surface (106) of the outer flowpath liner (80).

As shown by the directional arrows in FIG. 4, cooling air is introduced into the turbine frame (34) through entrance ports (110) formed in the outer casing (12). The cooling air flows over and through the impingement baffle (108) to cool the outer surface (106) of the outer flowpath liner (80). An annular 360° seal (115) in the form of a thin metal plate contains and seals the cooling air between the outer casing and the outer flowpath liner (80).

A row of air injection holes (112) is formed through the outer flowpath liner (80) to allow the cooling air to pass therethrough to flow over the aft inner surface (114) of the outer flowpath liner and enter the flowpath (14). Cooling air also travels through slot (90) in the outer flowpath liner and flows around the spacer strut (54) and bolts (56, 57) and through the fairing (84) to cool the inner flowpath liner (82) in a conventional manner.

Assembly of the turbine frame (34) is quicker and easier than conventional welded turbine frames. The bolts (56) are guided through the bolt holes (114) in the inner ring with the spacer struts held in place with threaded fasteners (74). The bolts are then advanced through the slot (94) in the inner flowpath liner (82) up to the outer flowpath liner (80).

This subassembly is then aligned within the outer casing (12) and the bolts (56, 57) are then advanced through the bolt holes (116) in the outer casing and torqued down with a low force via threaded nuts (118) to prestress the bolts (56, 57) to about 10% of their maximum allowable load. This entire bolted structure may then be mounted to an annular inner casing member (120) with fasteners via mounting holes (122), as shown in FIGS. 2 and 3. An outer duct or cover (124) may be attached to the outer casing (12) with links (126) in a conventional fashion.

The radial length of each spacer strut (54) is accurately machined as is the depth and inner surfaces of each positioning slot (64) and flat (76). Applying minimum torque to nuts (118) seats the spacer struts (54) to their mating surfaces in the slots (64) and on the flats (76). Additional bolt prestress will reduce the maximum tensile load carrying capability of the bolts and frame in the event of a turbine blade is lost during engine operation. A particular advantage of this construction is the elimination of special assembly tooling, as standard tooling may be used during frame assembly.

It can be readily appreciated that this bolted frame structure is faster and easier to construct than a welded structure. In addition, the bolts (56, 57) are lighter and less costly than welded joints of equivalent strength. In practice, bolts (56, 57) having a diameter of approximately one-half inch have been found to function adequately for aircraft engine applications.

The bolts (56, 57) remain in tension throughout engine operation and "shut down" while the spacer struts (54) are generally under compression from the initial loading of the bolts. As the engine temperature rises upon start up, the inner ring (52) and the spacer struts (54) thermally expand radially outwardly to a greater extent than the outer casing (12), thereby urging the struts to poke through the outer casing. This loading increases the compression on the spacer struts (54) and maintains the outer casing in tension. The polygonal ribbed portion (46) adequately accommodates this tension or hoop stress with the aid of the tensioned bolts (56, 57).

Thus, the bolts serve as critical structural support members as well as fasteners to both accommodate turbine frame hoop stress as well as to interconnect the inner ring with the outer casing while providing a support for the heat shield assembly (78). The bolts also absorb offset bearing induced bending loads and reduce bending loads in the frame structure.

Another advantage of this bolted turbine frame assembly is its ability to confine and limit damage to the engine (10) in the event of the loss of a turbine blade. That is, when a turbine blade is lost, the loading on the engine frame increases and may cause secondary damage to other engine components. The tensioned bolted configuration, in combination with the compressed spacer struts has been found to isolate the damage and prevent secondary damage to allow the engine to continue operating.

There has been disclosed heretofore the best embodiment of the invention presently contemplated. However, it is to be understood that various changes and modifications may be made thereto without departing from the spirit of the invention.

What is claimed is:

1. A frame assembly for a turbine engine comprising:
   an outer casing serving as an outer structural support member;
   an inner ring serving as an inner structural support member;
   a plurality of spacer struts extending between said inner ring and said outer casing; and
   a compression means for maintaining said spacer struts in substantially constant compression between said inner ring and said outer casing.

2. The frame assembly of claim 1, wherein said outer casing comprises a one-piece cast annular member.

3. The frame assembly of claim 1, wherein said inner casing comprises an annular member formed from a plurality of axially separated segments.

4. The frame assembly of claim 1, wherein said outer casing is comprises a circumferential reinforcing portion having a polygonal profile.

5. The frame assembly of claim 1, wherein said outer casing is formed with a plurality of slots for receiving and locating said spacer struts.

6. The frame assembly of claim 1, wherein said compression means comprises a plurality of rods radially extending between and interconnecting said inner ring and said outer casing.

7. The frame assembly of claim 6, wherein said plurality of rods comprises a plurality of threaded bolts arranged circumferentially in the pattern of a spoked array between said inner ring and said outer casing.

8. The frame assembly of claim 1, further comprising a heat shield assembly operatively associated with said frame assembly.

9. The frame assembly of claim 8, wherein said heat shield assembly is mounted on said compression means.

10. The frame assembly of claim 8, wherein said compression means comprises a plurality of rods radially extending between said inner ring and said outer casing, and wherein said heat shield assembly is mounted on said rods.

11. The frame assembly of claim 8, wherein said heat shield assembly comprises an outer flowpath liner, an inner flowpath liner and a fairing interconnecting said inner and outer flowpath liners.

12. The frame assembly of claim 11, wherein said heat shield assembly comprises a one-piece brazed assembly.

13. The frame assembly of claim 11, wherein said heat shield assembly further comprises an impingement baffle provided on said outer flowpath liner.

14. The frame assembly of claim 8, wherein said heat shield assembly is exclusively supported by said compression means.

15. The frame assembly of claim 8, wherein said heat shield assembly is freely mounted on said compression means to allow said heat shield assembly to thermally expand and contract without constraint.

* * * * *